(12) United States Patent
Byun et al.

(10) Patent No.: US 7,968,225 B2
(45) Date of Patent: *Jun. 28, 2011

(54) SECONDARY BATTERY WITH ENHANCED CONNECTION OF PROTECTION CIRCUIT UNIT TO CAP PLATE

(75) Inventors: Jeongdeok Byun, Yongin-si (KR); Kyungwon Seo, Yongin-si (KR); Nohyun Kwakg, Yongin-si (KR); Sangkwon Nam, Yongin-si (KR); Seok Koh, Yongin-si (KR); Bohyun Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/889,369

(22) Filed: Sep. 23, 2010

(65) Prior Publication Data

US 2011/0014502 A1    Jan. 20, 2011

Related U.S. Application Data

(63) Continuation of application No. 11/496,285, filed on Jul. 26, 2006, now Pat. No. 7,807,291.

(30) Foreign Application Priority Data

Aug. 1, 2005   (KR) .................. 10-2005-0070337

(51) Int. Cl.
*H01M 2/26* (2006.01)
*H01M 2/00* (2006.01)
*H01M 2/02* (2006.01)

(52) U.S. Cl. ........ 429/161; 429/162; 429/163; 429/175; 429/178

(58) Field of Classification Search .................. 429/161, 429/162, 163, 175, 178
See application file for complete search history.

(56) References Cited

U.S. PATENT DOCUMENTS

| | | |
|---|---|---|
| 2,953,620 A | 9/1960 | Smyth et al. |
| 2005/0089753 A1 | 4/2005 | Yoon |
| 2005/0153172 A1 | 7/2005 | Han |
| 2005/0221174 A1 | 10/2005 | Yoon |
| 2005/0221176 A1 | 10/2005 | Kim |
| 2006/0003192 A1 | 1/2006 | Lim |
| 2007/0026296 A1 | 2/2007 | Byun et al. |

OTHER PUBLICATIONS

Office Action dated Mar. 24, 2010, for U.S. Appl. No. 11/496,285, citing the relevant documents listed in this IDS, 8 pages.
Notice of Allowance dated Jun. 2, 2010, for U.S. Appl. No. 11/496,285, 6 pages.

*Primary Examiner* — Patrick Ryan
*Assistant Examiner* — Muhammad Siddiquee
(74) *Attorney, Agent, or Firm* — Christie, Parker & Hale, LLP

(57) ABSTRACT

In the secondary battery, a lead plate is provided so as not to overlap the position of the sealing unit of the electrolyte injection hole to enhance the fixation of the lead plate to the upper surface of the cap plate of a cap assembly. The position of a connection terminal of a protective circuit unit corresponds to the position of the lead plate and together with the connection terminal shape the connection terminal is prevented from being exposed to the outside during hot-melt molding.

19 Claims, 5 Drawing Sheets

SECONDARY BATTERY WITH ENHANCED CONNECTION OF PROTECTION CIRCUIT UNIT TO CAP PLATE

CROSS-REFERENCE TO RELATED APPLICATIONS

The present application is a continuation of U.S. application Ser. No. 11/496,285, filed on Jul. 26, 2006, now U.S. Publication No. 2007-0026296-A1, dated Feb. 1, 2007, which claims priority to and the benefit of Korean Patent Application No. 10-2005-0070337, filed on Aug. 1, 2005, in the Korean Intellectual Property Office. The entire content of each of the above-referenced applications is incorporated herein by reference.

BACKGROUND

1. Field of the Invention

The present invention relates to a secondary battery, and more particularly, to a secondary battery in which the fixation of a lead plate to the top of a cap plate is enhanced and connection terminals are not exposed to the outside during hot-melt molding.

2. Discussion of Related Art

Chargeable/dischargeable batteries (also know as secondary batteries) are widely used in high-technology electronic apparatuses such as cellular phones, notebook computers, and camcorders. In particular, lithium secondary batteries have high energy density per unit weight and are widely used as power sources of electronic apparatuses.

Conventional polygon type lithium secondary batteries include a polygonal can, an electrode assembly accommodated in the can, a cap assembly that closes the opening of the can and that includes a cap plate, a lead plate and a breaker that are coupled with the upper surface of the cap plate, a protective circuit unit connected to the lead plate and the breaker through connection terminals, and a molding resin part with which a gap between the cap assembly and the protective circuit unit is filled. However, the structure and position of the conventional lead plate creates problems for the connection terminals.

Referring to FIGS. 1 and 2, an electrolyte injection hole is formed on one side of the cap plate 110 and a sealing unit 160 seals the electrolyte injection hole after the electrolyte is injected. The sealing unit 160 may have various shapes. For example, after a ball having a diameter larger than the diameter of the electrolyte injection hole is put on the entrance of the electrolyte injection hole and is mechanically press fitted into the electrolyte injection hole to form the sealing unit 160. Welding is then performed along the edge of the sealing unit 160 to seal the electrolyte injection hole. The ball is commonly formed of Al or a metal including Al, the ball material being the same material as the cap plate 110 in order to facilitate welding. In another method, after a thin sealing plate larger than the electrolyte injection hole is brought into surface contact with the top of the electrolyte injection hole, welding is performed along the edge of the sealing plate to seal the electrolyte injection hole.

Typically, the sealing unit 160 of the electrolyte injection hole and the welding part are not even but slightly protrude above the upper surface of the cap plate 110. Also, in order to prevent the electrolyte from leaking, the sealing unit 160 and the welding part are commonly coated with a hardener such as an ultraviolet (UV) hardener so that the sealing unit 160 and the welding part protrude above by the thickness of the coating film.

As illustrated in FIG. 1, although a through hole is formed on the bottom plate of a conventional lead plate 410, since the lower ends of the both side walls of the lead plate cross the sealing unit 160 and the welding part or the hardener coated part that protrude above the cap plate 110, the lead plate 410 is not firmly welded to the cap plate 110.

FIG. 2 is a front view illustrating that the lead plate 410 and the protective circuit unit 300 of the secondary battery illustrated in FIG. 1 are connected to each other through the connection terminal 360. The shapes of the side walls of the lead plate 410 and the position in which the connection terminal 360 is connected to the protective circuit are limited to some extent due to the protruding parts of elements in the protective circuit unit 300. The conventional connection terminal 360 is commonly L-shaped in a front view so that a part of the L-shaped part is not welded to the lead plate 410.

Therefore, when a part of the connection terminal 360 is welded to the side wall of the lead plate 410 and the connection terminal 360 is bent to be connected to the protective circuit, the part of the connection terminal 360 that is not welded to the lead plate 410 and that is not supported may protrude or may be deformed so that the connection terminal 360 may be exposed to the outside during hot-melt molding.

SUMMARY OF THE INVENTION

In accordance with the present invention a secondary battery is provided that is capable of enhancing the fixation of a lead plate to the top of a cap plate and of preventing connection terminals from being exposed to the outside during hot-melt molding thereby improving the reliability and mass production quality thereof.

An exemplary embodiment of a secondary battery in accordance with the present invention includes an electrode assembly in which different two electrodes and a separator interposed between the two electrodes are laminated with each other to be wound. A container type can house the electrode assembly. A cap assembly includes a cap plate that is coupled with the open top of the can and in which an electrolyte injection hole is formed, and an electrode terminal. A lead plate electrically connected to the connection terminal of a protective circuit unit is positioned on the upper surface of the cap plate in a space between the electrode terminal and the sealing unit of the electrolyte injection hole.

The lead plate may include a bottom plate fixed to the upper surface of the cap plate and side walls integrated with the bottom plate.

The connection terminal may be obtained by bending a square flat plate so that one surface is welded to one side wall of the lead plate and that the other surface is electrically connected to the protective circuit unit based on the bent part.

The width of the one surface of the connection terminal in an exemplary embodiment may be smaller than the width of the one side wall of the lead plate so that the one surface is limited to the section from side to side of the one side wall.

Holes or grooves may be formed in some parts of the side walls of the lead plate.

DETAILED DESCRIPTION

Figure 1:
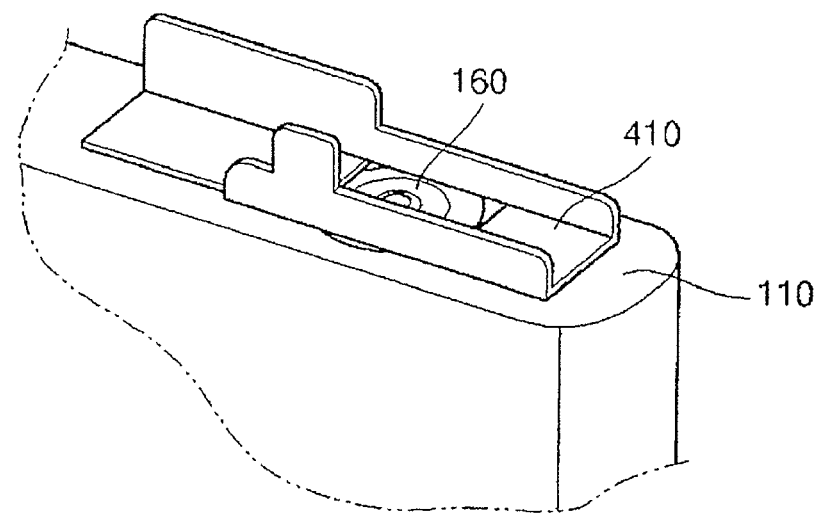
FIG. 1 is an enlarged partial perspective view of a conventional secondary battery in which a lead plate is attached to the sealing unit of an electrolyte injection hole.
Figure 2:
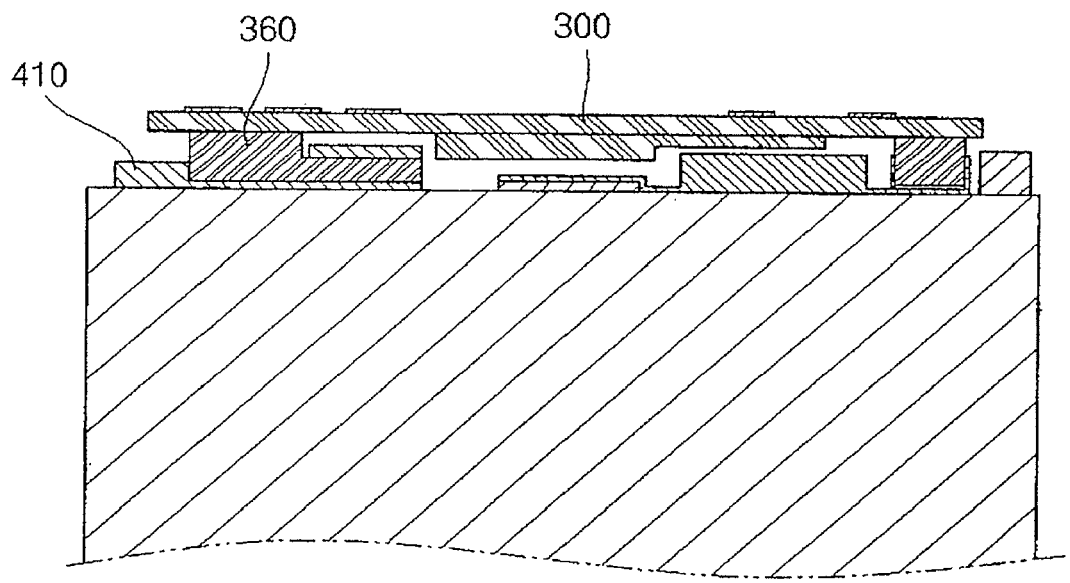
FIG. 2 is a front view illustrating that the lead plate and the protective circuit unit of the secondary battery illustrated in FIG. 1 are connected to each other through a connection terminal.
Figure 3:
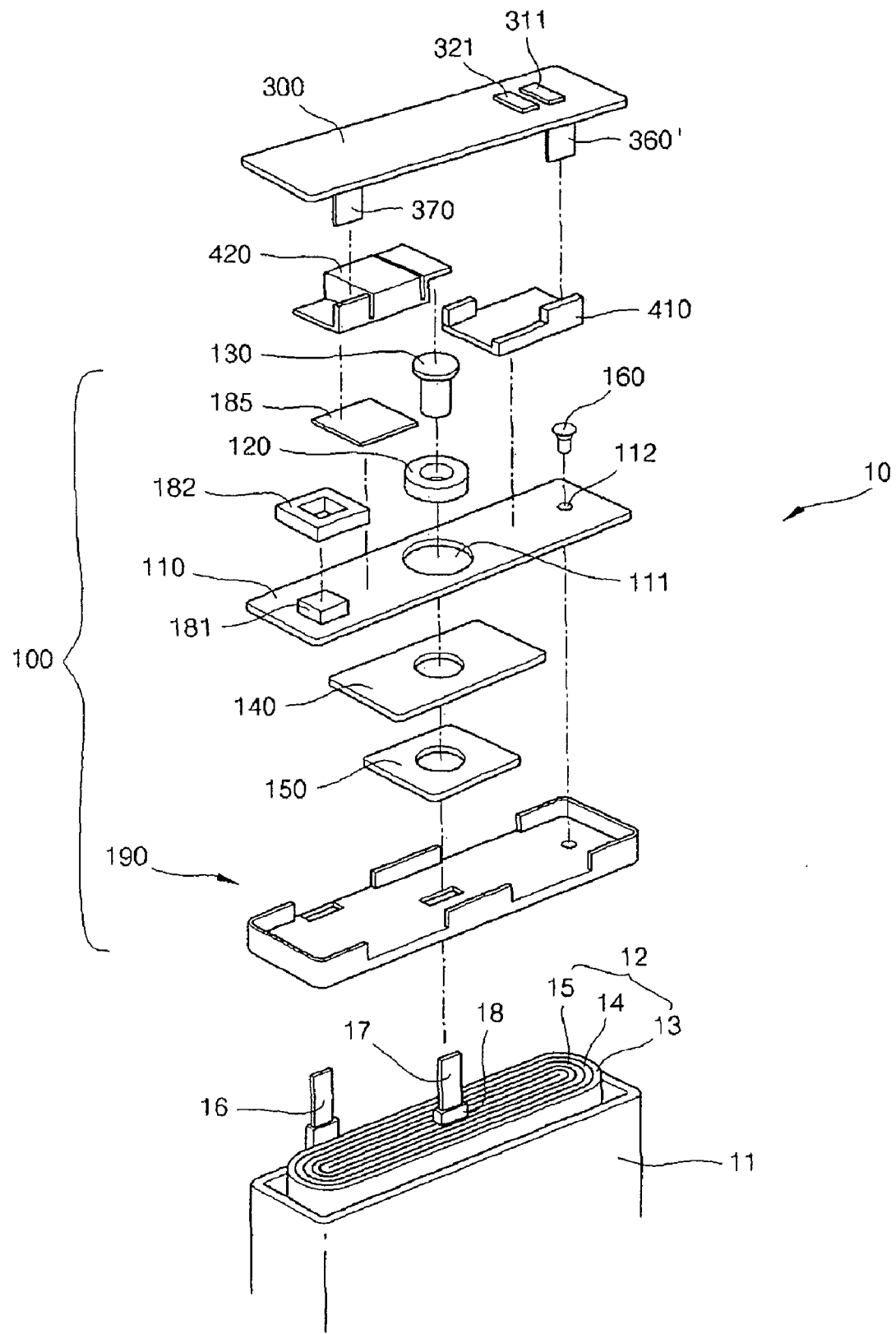
FIG. 3 is an exploded perspective view illustrating a secondary battery according to an embodiment of the present invention.

Referring to FIG. 3, a secondary battery 10 includes an electrode assembly 12 and a can 11 that houses the electrode assembly 12. A cap assembly 100 closes the opening of the can 11 and includes a cap plate 110. A lead plate 410 and breaker 420 are coupled with the upper surface of the cap plate 110. A protective circuit unit 300 is connected to the lead plate 410 and the breaker 420 through connection terminals 360', 370. A molding resin part (not shown) fills a gap between the cap assembly 110 and the protective circuit unit 300.

In the electrode assembly 12, after a positive electrode 13 and a negative electrode 15 are formed of wide plates in order to increase electric capacity, a separator 14 for insulating the positive electrode 13 and the negative electrode 15 from each other is interposed between the positive electrode 13 and the negative electrode 15. The positive electrode 13, the separator 14, and the negative electrode 15 are laminated with each other and are wound in the form of a jelly roll. The negative electrode 15 and the positive electrode 13 may be formed by coating collectors made of Cu and Al foils with C as a negative electrode active material and $LiCoO_2$ as a positive electrode active material. The separator 14 is formed of polyethylene, polypropylene, or co-polymer of polyethylene and polypropylene. In an exemplary embodiment the separator 14 is formed to be wider than the positive electrode 13 and the negative electrode 15 to prevent the electrode plates 13, 15 from being short circuited. A positive electrode tab 16 and a negative electrode tab 17 that are connected to the positive electrode 13 and the negative electrode 15 protrude from the electrode assembly 12. An insulating tape 18 is wound around the positive and negative electrode tabs 16, 17 on the boundaries of the positive and negative electrode tabs 16, 17 that protrude to the outside of the electrode assembly 12 in order to prevent the electrode plates 13, 15 from being short circuited.

The can 11 is a rectangular parallelepiped container formed of a metal by a processing method such as deep drawing. Therefore, the can 11 can function as a terminal. In an exemplary embodiment the can is formed of Al or an Al alloy that is a light conductive metal. The can 11 becomes a container of the electrolyte assembly 12 and the electrolyte. The can top, with the electrode assembly 12 inserted and electrolyte injected, is sealed by the cap assembly 100.

The cap assembly 100 includes a cap plate 110, an electrode terminal 130, and a sealing unit 160. A terminal through hole 111 is formed in the cap plate 110. The electrode terminal 130, on whose external surface a gasket 120 is positioned so that the electrode terminal 130 is insulated from the cap plate 110, is provided to penetrate the terminal through hole 111. An insulating plate 140 is provided under the cap plate 110 and a terminal plate 150 is provided under the insulating plate 140. The lower end of the electrode terminal 130 is coupled with the terminal plate 150. The negative electrode 15 of the electrode assembly 12 is electrically connected to the electrode terminal 130 through the negative electrode tab 17 and the terminal plate 150. In the case of the positive electrode 13 of the electrode assembly 12, the positive electrode tab 16 is welded to the cap plate 110 or the can 11. An insulating case 190 may be further provided under the terminal plate 150. Alternatively, the battery may be designed so that polarities are reversed.

An electrolyte injection hole 112 for injecting an electrolyte into the can 11 is formed on one side of the cap plate 110. A sealing unit 160 for sealing the electrolyte injection hole 112 after injecting the electrolyte is provided. The sealing unit 160 may have various shapes. For example, after a ball having a diameter larger than the diameter of the electrolyte injection hole 112 is located at the entrance of the electrolyte injection hole 112 and is mechanically press fitted into the electrolyte injection hole 112 to form the sealing unit 160, welding is performed along the edge of the sealing unit 160 to seal the electrolyte injection hole 112. The ball is commonly formed of Al or a metal including Al, since the ball in an exemplary embodiment is formed of the same material as the cap plate 110 in order to facilitate welding. In another method, after a thin sealing plate larger than the electrolyte injection hole 112 is brought into surface contact with the top of the electrolyte injection hole, welding is performed along the edge of the sealing plate to seal the electrolyte injection hole 112. Also, in order to prevent the electrolyte from leaking, the sealing unit 160 and the welding part may be coated with a hardener such as an ultraviolet (UV) hardener.

A protrusion 181 and a holder 182 may be further formed on the upper surface of the cap plate 110 on the opposite side of the lead plate 410 with the electrode terminal 130 in the center of the cap plate 110. The protrusion 181 is a rectangular column in a top view. In order to have the protrusion 181 serve as a supporter that resists against an external force, coupling strength between the protrusion 181 and the cap plate 110 is large. Therefore, the protrusion 181 in an exemplary embodiment is formed of the same material as the cap plate 110 and is molded to be integrated with the cap plate 110. When the protrusion 181 is separately molded, the protrusion 181 is formed of the material that can be welded to the cap plate 110 with enough strength.

The holder 182 is coupled with the protrusion 181. The holder 182 has a groove formed so that the protrusion 181 can be tightly inserted into the holder 182. Since the protrusion 181 is rectangular in a top view and is inserted into the groove of the holder 182 that is supplementary to the protrusion 181, although a force may be applied to the side of the holder 182 when the holder 182 is inserted into the protrusion 181, the holder 182 does not easily deviate from the protrusion 181.

Referring still to FIG. 3, the protective circuit unit 300 having a protective circuit for preventing the battery from being excessively charged and discharged is connected to the lead plate 410 and the breaker 420. The lead plate 410 as the positive electrode is connected to the positive connection terminal 360' and the positive connection terminal 360' is electrically connected to an external input and output terminal 311 through the protective circuit. Also, the other end of the breaker 420 connected to the electrode terminal 130 serves as the negative electrode and is connected to the negative electrode connection terminal 370 and the negative electrode connection terminal 370 is electrically connected to an external input and output terminal 321 through the protective circuit. An insulating member 185 is positioned between the breaker 420 and the upper surface of the cap plate 110 to prevent the breaker 420 as the negative electrode and the cap plate 110 as the positive plate from being short circuited. The polarities of the electrodes may vary in accordance with an alternative embodiment.

The battery is housed in an additional armored body (not shown) in accordance with the kinds and shapes of the protective circuit unit and a battery accessories. A space between the protective circuit unit 300 and the cap plate 110 is filled with a low temperature molding resin by a hot melting method, and the battery is coated with a resin to form a pack battery.

The positions and shapes of the lead plate 410 and the connection terminal 360' will be described in more detail as follows.

Figure 4:
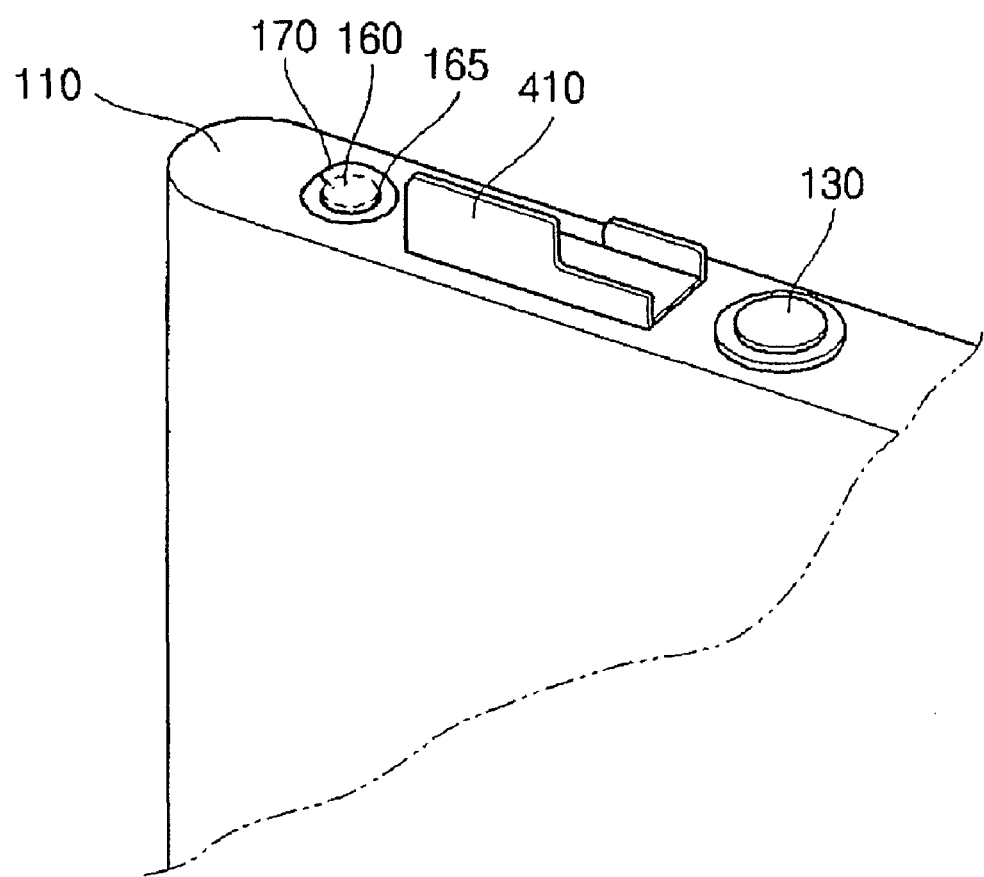
FIG. 4 is an enlarged partial perspective view illustrating that a lead plate is positioned between an electrode terminal and the sealing unit of an electrolyte injection hole according to another embodiment of the present invention.

Referring to FIG. 4, the lead plate 410 electrically connected to an external input and output terminal (not shown) is positioned on the upper surface of the cap plate 110 (i.e., that surface distal from the electrode assembly) in a space between the electrode terminal 130 and the sealing unit 160 of the electrolyte injection hole.

Figure 5A:
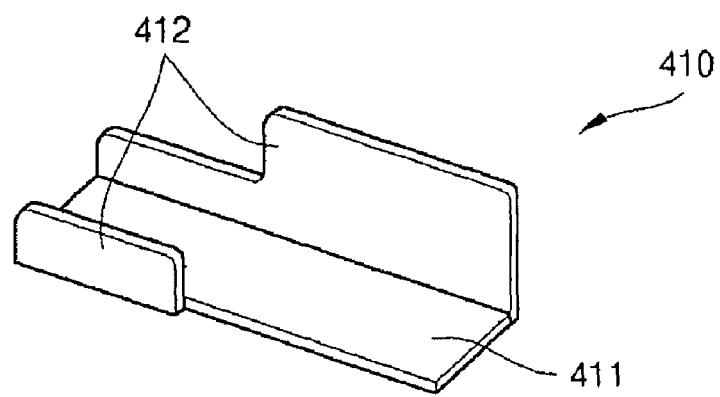
FIGS. 5A, 5B and 5C are perspective views illustrating lead plates according to embodiments of the present invention.

As illustrated in FIG. 5A, the lead plate 410 includes a bottom plate 411 fixed to the upper surface of the cap plate 110 and side walls formed to be integrated with the bottom plate 411.

The lead plate 410 is formed of Ni, a Ni alloy, or stainless steel coated with Ni to have a thickness in the range of from 0.05 to 0.5 mm. The thickness of the lead plate 410 is related to the thickness of the can and facility in welding. In the case where the lead plate 410 is formed to be thick, according to the pack battery formed by filling a space between a bare cell (a battery in a state where a cap assembly is coupled with a can into which an electrode assembly is inserted) sealed by the cap assembly and the protective circuit unit with a resin, it is possible to increase resistance strength against an external force when the battery is twisted or bent, which is advantageous.

The side walls 412 of the lead plate 410 may be L-shaped in a front view in order to prevent the side wall 412 from contacting the elements that protrude from the protective circuit unit.

As described above, when the electrolyte injection hole is sealed by press fitting the ball or by the sealing plate, the sealing unit 160 of the electrolyte injection hole and the welding part are not even but slightly protrude above the upper surface of the cap plate 110 due to the sealing and welding. Also, a region including the sealing unit 160 and the welding part 165 may be coated with a hardener 170 so that the region including the sealing unit 160 and the welding part 165 protrudes above the upper surface of the cap plate 110 by the thickness of the hardener film due to the hardener 170 being coupled with the top of the region including the sealing unit 160 and the welding part 165.

Therefore, when the bottom plate 411 of the lead plate 410 is fixed between the sealing unit 160 of the electrolyte injection hole and the electrode terminal 130 to avoid the protruding part, the lead plate 410 and the cap plate 110 can be firmly welded to each other.

The manner in which the bottom plate 411 and the side walls 412 of the lead plate 410 are formed to be integral with each other may be by bending an individual plate. The angle formed by the bending in an exemplary embodiment is about 90°, since resistance strength against the external force applied to the pack battery is largest and the lead plate 410 can be easily coupled with the connection terminal 360' when the angle formed by the bent parts is 90°.

Figure 5B:
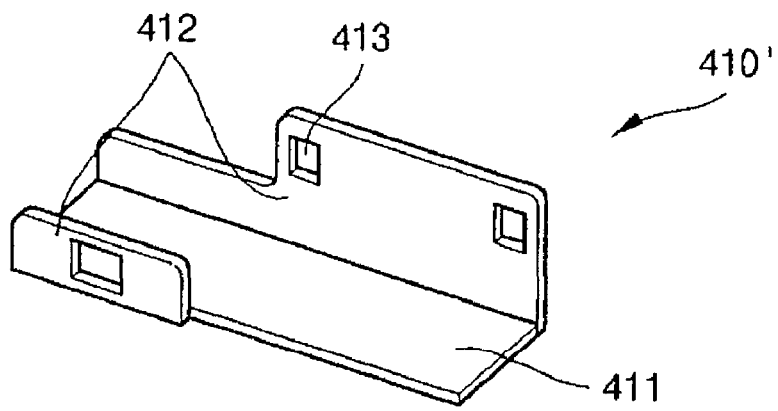

As illustrated in FIG. 5B, a lead plate 410' according to another embodiment of the present invention includes the bottom plate 411 fixed to the upper surface of the cap plate 110 and the side walls 412 integrated with the bottom plate 411 and holes are formed in some parts of the side walls 412.

The lead plate is provided for an electric connection. However, it may be stuck in the molding resin part since the side walls of the lead plate protrude from the boundary between the lead plate and the molding resin part into the molding resin part to fix the molding resin part and the bare cell to each other. As illustrated in FIG. 5B, when the holes 413 are formed in some parts of the side walls 412 of the lead plate 410', since the molding resin is molded to be integrated with the insides and outsides of the side walls 412 through the holes 413 of the side walls 412, it is possible to more firmly fix the molding resin part and the bare cell to each other. The holes 413 in an exemplary embodiment are formed in the parts of the side walls of the lead plate 410' excluding the parts that contact the connection terminal.

Figure 5C:
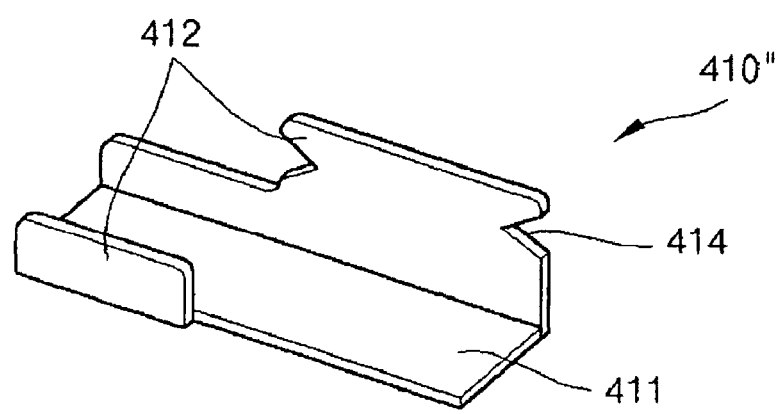

As illustrated in FIG. 5C, a lead plate 410" according to still another embodiment of the present invention includes the bottom plate 411 fixed to the upper surface of the cap plate 110 and the side walls 412 integrated with the bottom plate 411. Grooves 414 are formed in some parts of the side wall 412 to more firmly fix the molding resin part and the bare cell to each other.

The holes 413 and the grooves 414 may be simultaneously formed.

Figure 6:
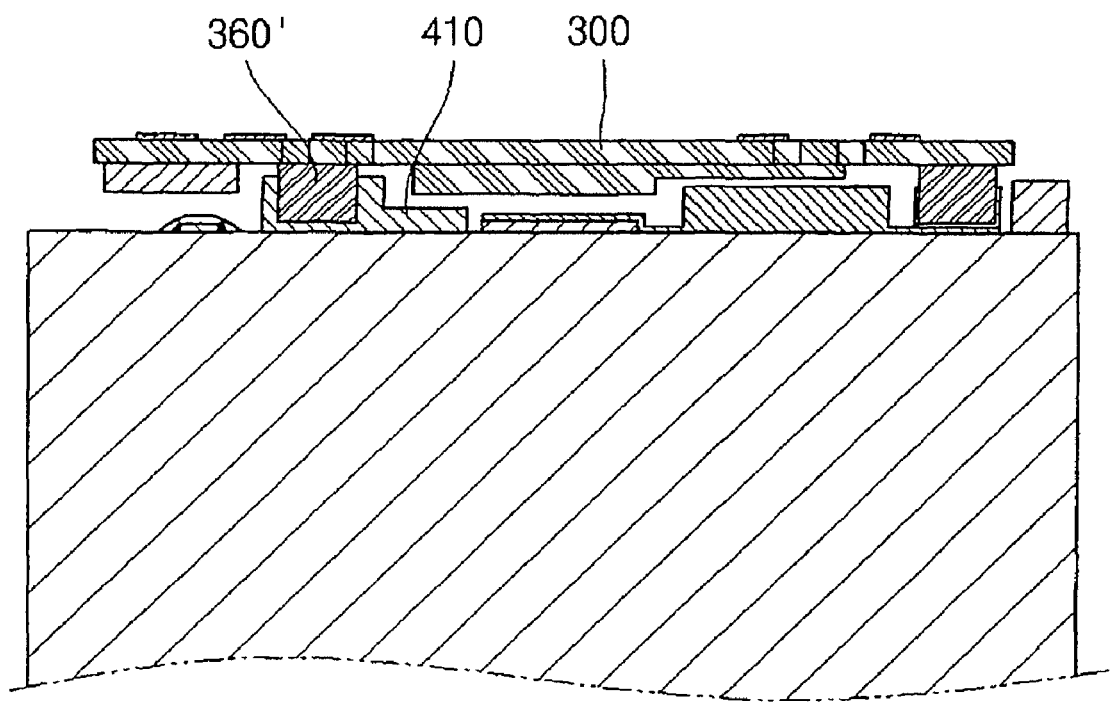
FIG. 6 is a front view illustrating that the lead plate and the protective circuit unit of the secondary battery illustrated in FIG. 4 are connected through a connection terminal.

Referring now to FIG. 6, the connection terminal 360' as the positive connection terminal is obtained by bending a square flat plate so that one surface of the connection terminal 360' is welded to one side surface of the lead plate 410 and that the end of the other surface is connected to the protective circuit of the protective circuit unit 300 immediately on the one side wall based on the bent part. That is, the position of the connection terminal 360' may change to correspond to the position of the lead plate 410 so that the conventional L-shaped connection terminal may be replaced by a straight linear connection terminal.

The width of the one surface of the connection terminal 360' in an exemplary embodiment may be smaller than the width of the one side wall of the lead plate 410 so that the one surface is limited to the section from side to side of the one side wall. Therefore, unlike the conventional L-shaped connection terminal, the one surface of the connection terminal 360' according to an embodiment of the present invention is welded to the one side wall of the lead plate 410 to be firmly supported.

Therefore, although the part in which the connection terminal 360' and the protective circuit are connected to each other is bent after the one surface of the connection terminal 360' is welded to the one side of the lead plate 410, the connection terminal 360' does not protrude or is not deformed and the connection terminal 360' is not exposed to the outside during the hot-melt molding so that it is possible to improve the reliability and mass production quality of the battery.

According to the present invention, the lead plate is provided so as not to overlap the position of the sealing unit of the electrolyte injection hole so that it is possible to enhance the fixation of the lead plate to the upper surface of the cap plate. The position of the connection terminal changes so as to correspond to the position of the lead plate and the conventional L-shaped connection terminal is replaced by the straight linear connection terminal so that it is possible to prevent the connection terminal from being exposed to the outside during the hot-melt molding and to thus improve the reliability and mass production quality of the battery.

Although a exemplary embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A secondary battery comprising:
an electrode assembly;
a can housing the electrode assembly;
a cap assembly enclosing the electrode assembly within the can, the cap assembly comprising a cap plate, the cap plate having an electrolyte injection hole;
a sealing unit sealing the electrolyte injection hole;
an electrode terminal coupled to the electrode assembly and protruding from the cap plate;
a protective circuit unit; and
a lead plate electrically connected to the protective circuit unit, the lead plate comprising a bottom plate on the cap plate, the bottom plate having a first end at the electrode terminal and a second end terminating before the sealing unit.

2. The secondary battery of claim 1, wherein the bottom plate has a continuous conductive line extending from the first end to the second end along a central length of the cap plate.

3. The secondary battery of claim 2, wherein the continuous conductive line is in continuous contact to the cap plate.

4. The secondary battery of claim 1, wherein the sealing unit protrudes from the cap plate.

5. The secondary battery of claim 1, further comprising:
a welding part welding a boundary between the sealing unit and the cap plate; and
a hardener coupled with a region comprising the sealing unit and the welding part.

6. The secondary battery of claim 1, wherein the lead plate further comprises first and second side walls protruding from the bottom plate.

7. The secondary battery of claim 6, wherein the first and second side walls are integrally provided with the bottom plate by bending portions of an individual plate.

8. The secondary battery of claim 6, wherein the protective circuit unit further comprises a connection terminal, the lead plate electrically connected to the connection terminal, and a width of the connection terminal is less than that of each of the first and second side walls.

9. The secondary battery of claim 6, wherein the first and second side walls have holes or grooves.

10. A secondary battery comprising:
an electrode assembly;
a can housing the electrode assembly;
a cap assembly enclosing the electrode assembly within the can, the cap assembly comprising a cap plate, the cap plate having an electrolyte injection hole;
a sealing unit sealing the electrolyte injection hole;
an electrode terminal coupled to the electrode assembly and protruding from the cap plate;
a protective circuit unit; and
a lead plate electrically connected to the protective circuit unit, the lead plate comprising a bottom plate on the cap plate, the bottom plate having a first end and a second end, a distance between the first end and the second end being less than that between the electrode terminal and the sealing unit.

11. The secondary battery of claim 10, wherein a distance between the first end and the electrode terminal is less than that between the second end and the electrode terminal, and wherein a distance between the second end and the sealing unit is less than between the first end and the sealing unit.

12. The secondary battery of claim 10, wherein the bottom plate has a continuous conductive line extending from the first end to the second end along a central length of the cap plate.

13. The secondary battery of claim 12, wherein the continuous conductive line is in continuous contact to the cap plate.

14. The secondary battery of claim 10, wherein the sealing unit protrudes from the cap plate.

15. The secondary battery of claim 10, further comprising:
a welding part welding a boundary between the sealing unit and the cap plate; and
a hardener coupled with a region comprising the sealing unit and the welding part.

16. The secondary battery of claim 10, wherein the lead plate further comprises first and second side walls protruding from the bottom plate.

17. The secondary battery of claim 16, wherein the first and second side walls are integrally provided with the bottom plate by bending portions of an individual plate.

18. The secondary battery of claim 16, wherein the protective circuit unit further comprises a connection terminal, the lead plate electrically connected to the connection terminal, and a width of the connection terminal is less than that of each of the first and second side walls.

19. The secondary battery of claim 16, wherein the first and second side walls have holes or grooves.

* * * * *